Patented Apr. 10, 1934

1,953,937

UNITED STATES PATENT OFFICE 1,953,937

PURIFICATION OF PHTHALIC ANHYDRIDE

Alphons O. Jaeger, Crafton, Pa., assignor, by mesne assignments, to The Selden Research & Engineering Corporation, Pittsburgh, Pa., a corporation of Delaware No Drawing. Application May 18, 1928, Serial No. 278,648. In Canada December 22, 1927

2 Claims. (Cl. 260—123)

This invention relates to methods of purifying phthalic anhydride and particularly phthalic anhydride prepared by the vapor phase catalytic oxidation of naphthalene.

Depending on the catalyst used and on the conditions of reaction, phthalic anhydride, which is prepared by the catalytic vapor phase oxidation of naphthalene in the presence of oxygen-containing gases, contains various impurities, such as, for instance, the primary oxidation product of naphthalene alphanaphthaquinone and condensation and polymerization products of alphanaphthaquinone, such as, for example $\beta\beta$ dinaphthyldiquinone and condensation products of alphanaphthaquinone with phthalic anhydride to form phthaleins and the like, which are of more or less complicated composition and which are in part colored and as a result tend to turn technical phthalic anhydride yellow, gray, brown, red or green.

There are also frequently present other impurities whose chemical constitution is not definitely known, such as tarry products and the like. A further class of impurities are further oxidation products, such as maleic acid and traces of benzoic acid which are frequently noted in technical phthalic anhydride. The relative amounts of these various impurities depend on the conditions of reaction and on the nature of the catalyst used.

Crude phthalic anhydride is usually purified by sublimation and this may be considered as the standard commercial method today. This process, however, does not remove all of the impurities, as some of them are volatile and therefore pass over with the phthalic anhydride and may render it unsuitable for certain purposes.

According to the present invention, the volatile impurities are transformed into relatively non-volatile products or at least products which have a much higher boiling point than phthalic anhydride and are hence separable therefrom by sublimation or distillation. I have found that most of these volatile impurities are of an unsaturated nature and can be transformed into relatively non-volatile products by various physical and chemical means.

A very effective means for transforming the impurities into non-volatile products consists in heating the technical phthalic anhydride for shorter or longer time, depending on the amount of impurities with or without elevated pressure, and, in some cases, even under diminished pressure. In general, adequate agitation should be used as it assists in bringing about a rapid and uniform result. The heating which may advantageously be at about the boiling point of phthalic anhydride at the particular pressure chosen, causes the unsaturated impurities to condense or polymerize to non-volatile or high boiling products, which can then easily be separated from the phthalic anhydride by distillation or sublimation. I have found that high pressure is very effective and when high pressure is used, it is frequently not necessary to heat up to the boiling point of phthalic anhydride, but, on the contrary, in many cases a temperature of from 150 to 280° C. is quite sufficient. The time of heating can be varied in accordance with the nature of the product, the temperature and pressure used, but should be continued for a sufficient time to bring about the desired effects. I have found that for most grades of technical phthalic anhydride, heating for two to ten hours or longer is desirable.

The use of pressure considerably shortens the heating period and appears to act as a physical condensation or polymerization promoter. When elevated pressures are used, it is possible, in some cases, to distill the phthalic anhydride without long continued preliminary heating.

The general method of continued heating, particularly under pressure, in order to polymerize or condense the impurities, may be modified in various ways which may be desirable in certain cases. For example, instead of heating the phthalic anhydride continuously in the liquid phase, it may be allowed to boil and condense in a condenser having a relatively large condensation surface and preferably a reflux condenser. This is particularly effective with phthalic anhydrides which contain large amounts of impurities. The size of the condenser and shape can be varied in order to adapt it for various installations. We have found that a condenser containing a large number of tubes is a very desirable type. The tubes can be of any suitable height and we have found that for practical purposes, condensers having tubes from 1 to 1½ meters high, produce excellent results. The phthalic anhydride vapors condense on the large surface and rapid cooling on the rough surface of the condenser rapidly transforms the impurities into non-volatile or high boiling products. By this method, the period of heating may be very greatly decreased with a corresponding large saving in time and heat.

Instead of using a condenser, the increased rough surface may be provided in a column by the introduction of fragments of quartz, pumice, granules or shavings of metals or alloys or bodies having a large surface such as, for example, absorbing bodies, as coke, silica gel fragments, activated carbon, fragments of kieselguhr, diatomaceous stones, unglazed porcelain fragments and other artificially prepared absorption and adsorption media.

Instead of using materials having rough surfaces in order to promote the condensation or polymerization of impurities, condensation or polymerization catalysts may be used which do not have any suitable effect on phthalic anhydride. Among such catalysts may be mentioned aluminum oxide, chromium salts, manganese oxide, zinc oxide, ferric oxide and others which may be used alone or in admixture. A very effective manner of utilizing these catalysts is to cause the vapors or phthalic anhydride which contain the volatile impurities to contact with the catalyst, for example, in a reflux condenser. This very intimate contact with the catalyst brings about a very effective and rapid condensation or polymerization. By this means, it is frequently possible to cut down the heating time very materially, it frequently being only necessary to heat to the boiling point of phthalic anhydride for two to four hours followed by fractional distillation or sublimation and resulting in a phthalic anhydride of great purity. In some cases, it is even possible to directly distill, permitting the vapors to contact with the condensation or polymerization catalysts, in which case the prolonged heating may be entirely omitted.

The heating of the phthalic anhydride may advantageously be gradual. This can be achieved by using a kettle which is heated by a bath, for example, of an amalgam or other metal alloy, mercury, sulfur, eutectic mixtures of inorganic salts and the like. These baths may be heated directly or indirectly. It is also possible to heat the kettle directly with gases or water under high pressure by means of the Frederking system, which is very effective in bringing about an even and uniform heating.

Instead of utilizing solid condensation or polymerization catalysts in large fragments placed in a condenser, finely divided condensation or polymerization catalysts or absorbing media can be introduced into the hot molten phthalic anhydride or gaseous catalysts may be thus introduced. Solid catalysts may be introduced in finely divided form, or superheated steam can be used as a gaseous catalyst or condensing agent. When superheated steam is blown into the phthalic anhydride melt many of the impurities, particularly quinonoid bodies, are transformed into relatively non-volatile colored compounds of high molecular weight.

The various methods enumerated above may be combined in many cases with advantage and such combined processes are included in the scope of the invention, which will be illustrated by the following examples, constituting illustrative embodiments of the principles of the invention, which, of course, is not limited to the exact details therein set forth.

*Example 1*

1,000 kg. of technical phthalic anhydride, produced by the vapor phase oxidation of naphthalene with air at 370-420° C. by the aid of vanadium catalysts, are placed in a kettle provided with a tubular reflux condenser of about 1 meter height. The mass is heated gradually and uniformly up to the boiling point (284.5°) and is maintained at this temperature for about six hours, the phthalic anhydride vapors condensing in the reflux condenser and flowing back into the kettle. After this heating period the phthalic anhydride is subjected to a fractional distillation which yields a completely colorless product. The last portions of the fractional distillation are slightly yellow and should be added to the next batch. The phthalic anhydride, which is distilled over, can be solidified in various ways, either by condensing on cooling drums or by blowing into the liquid or gaseous phthalic anhydride air or indifferent gases and catching in chambers. In this latter case, the phthalic anhydride is obtained in the form of colorless needles. The losses of phthalic anhydride by this purification method are, in general, not of serious moment and at the most amount of about 5 to 10%.

If pressure of from 1 to 3 atmospheres is used in conjunction with the long continued heating the heating period can be somewhat shortened and frequently it is unnecessary to heat up to the boiling point. Usually four hours of heating are entirely sufficient but the temperature and time will depend on the nature of the impurities present.

*Example 2*

1,000 kg. of technical phthalic anhydride are gradually heated to the boiling point in a kettle provided with a Frederking high pressure water heating system and the phthalic anhydride vapors are carried to a reflux condenser mounted on the kettle. This condenser is provided with condensation catalysts. After refluxing for two hours, the purified phthalic anhydride is distilled over and is substantially free from impurities. Instead of such catalysts, fragments of quartz, pumice or silica may be used, or zeolite-like bodies may be used and are almost as effective.

When condensation catalysts are used, it is often only necessary to heat one or two hours, depending on the amount of impurities contained in the phthalic anhydride and in some cases the phthalic anhydride can be simply distilled over, the vapors contacting with the catalyst. This latter process is particularly applicable where pressure is used to enhance the effectiveness of the catalyst.

Instead of causing the vapors of the phthalic anhydride to contact with the catalysts, the latter can be stirred into the molten phthalic anhydride. Such catalysts may be powdered aluminum chloride or zinc chloride or absorption media such as activated carbon. After condensation of the unsaturated impurities is complete the phthalic anhydride is distilled over and a product of high purity is obtained but by this method the yields are somewhat decreased.

*Example 3*

1,000 kg. of technical phthalic anhydride are heated for one-half hour to the boiling point in a kettle surrounded by a metal bath and subjected to a pressure of 3 to 5 atmospheres. A little superheated steam is then blown into the boiling melt, whereupon the pressure is allowed to drop and the phthalic anhydride distilled off. A colorless product of good purity is obtained.

In the claims, the expression "air oxidation phthalic anhydride" is used to cover a product which is produced by the vapor phase catalytic oxidation of naphthalene with air or oxygen-containing gases.

In the claims the two equivalent methods of recovering phthalic anhydride from the reaction mass, namely, distillation, that is to say, transformation of the phthalic anhydride into vapor at its boiling point, and sublimation, that is to say, transformation into vapor at temperatures below its boiling point, are included in the generic term "vaporization" which is used in the claims.

What is claimed as new is:

1. A method of purifying phthalic anhydride formed by air oxidation of naphthalene, which comprises heating it to the boiling point and causing the vapors produced to contact with condensation and polymerization catalysts in a reflux condenser, and submitting the condensed phthalic anhydride to vaporization.

2. A method of purifying phthalic anhydride formed by air oxidation of naphthalene, which comprises vaporizing it from a molten state, causing the vapors to contact with catalysts favoring condensation and polymerization of the impurities and thereupon condensing the phthalic anhydride vapors.

ALPHONS O. JAEGER.